Figure 5:
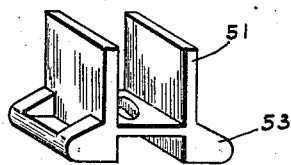

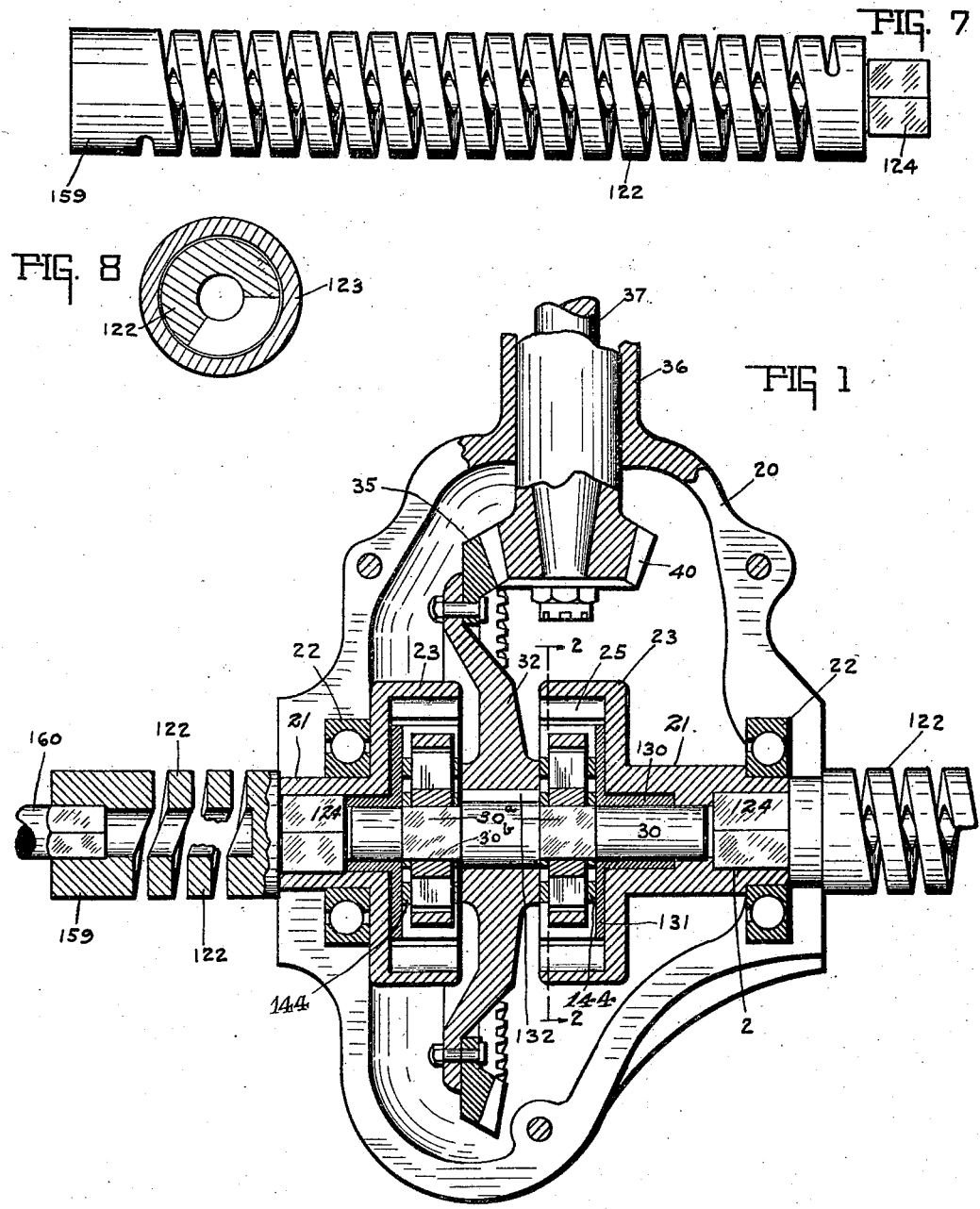

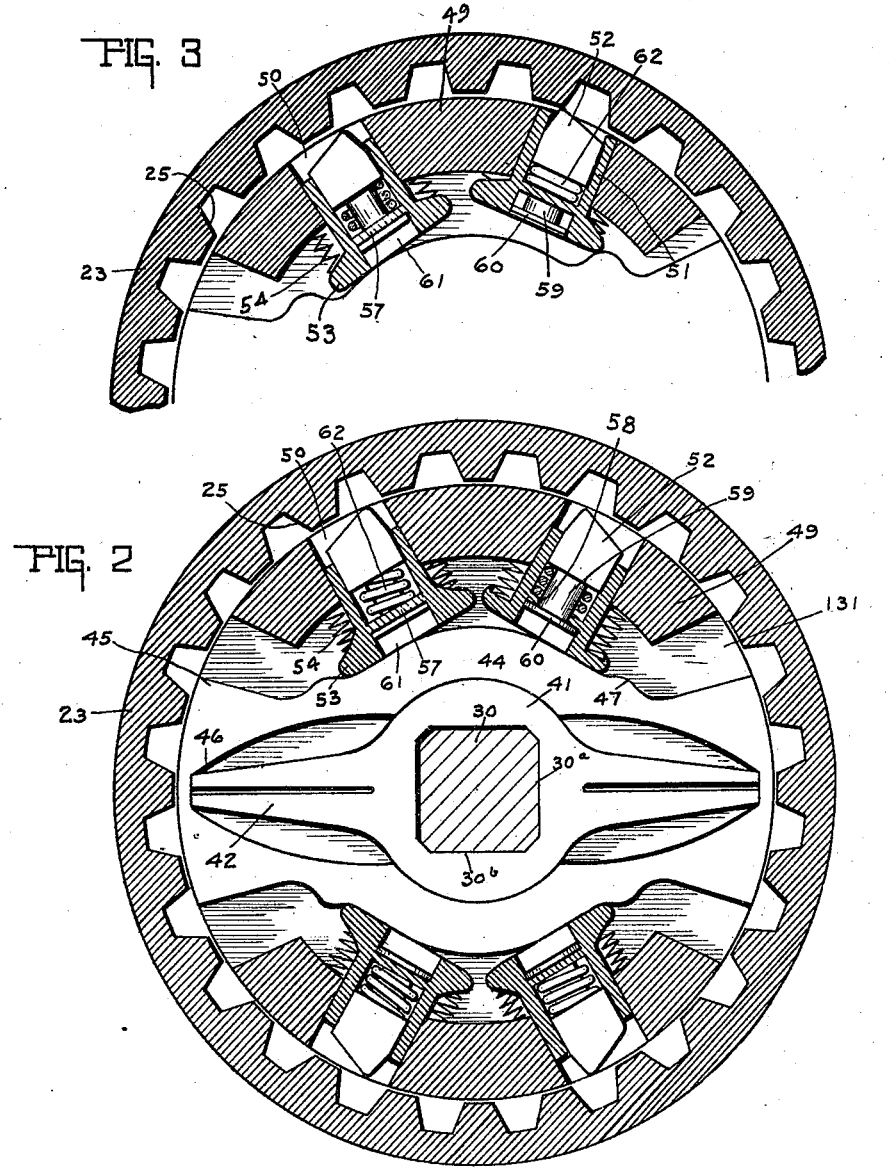

W. H. HARRIS.
DIFFERENTIAL DRIVE MECHANISM.
APPLICATION FILED JUNE 24, 1918.

1,414,126.

Patented Apr. 25, 1922.

3 SHEETS—SHEET 3.

Inventor
WILLIAM H. HARRIS.
Attorney

UNITED STATES PATENT OFFICE.

WILLIAM H. HARRIS, OF INDIANAPOLIS, INDIANA, ASSIGNOR, BY MESNE ASSIGNMENTS, TO THE DAYTON SECURITIES COMPANY, OF DAYTON, OHIO, A CORPORATION OF OHIO.

DIFFERENTIAL DRIVE MECHANISM.

1,414,126.

Specification of Letters Patent. Patented Apr. 25, 1922.

Application filed June 24, 1918. Serial No. 241,517.

*To all whom it may concern:*

Be it known that I, WILLIAM H. HARRIS, a citizen of the United States, and a resident of Indianapolis, county of Marion and State of Indiana, have invented a certain new and useful Differential Drive Mechanism; and I do hereby declare that the following is a full, clear, and exact description thereof, reference being had to the accompanying drawings, in which like letters refer to like parts.

This invention relates to differential drive mechanism for use with motor vehicles or with any other device for which it is suitable, arranged so that power will be transmitted constantly to both driven members.

It is well known that in the operation of automobiles and the like, power is not transmitted to both of the driven wheels at all times, particularly when turning, and the result is serious chiefly because of the loss of power when applied to only one instead of to both of said wheels and also when the one of said wheels to which power is being applied is on a slippery surface or in sand. In turning with automobiles and the like as at present constructed, the power is transmitted only to the outside wheel. With my invention the ordinary complex differential gearing is dispensed with and power is capable of being applied at all times to both wheels, but to a variable degree according to variation in their travel. Therefore, with my invention a double traction effect is obtained.

The chief feature of my invention consists in combining with yielding means through which power is applied in a power transmitting mechanism and whereby a differential effect on the driven members results therefrom within a reasonable limit of variation, supplementary means for producing a differential effect when the variation in the travel of the driven means is considerable. With only the yielding means for transmitting power in differential mechanism, the extent of the differential action is limited to the scope of the elasticity or movement of the yielding means. When, however, the spring action is not sufficient to provide for the differential effect demanded by the machine in emergencies, or in the case of automobiles when turning a very sharp turn or making a very long turn, such extra differential action is provided for by the improvement herein set forth which permits a ratcheting of the parts.

To the foregoing end there is combined with an internally toothed driven member and a driving member within the same through which power is transmitted by a spring structure, two kinds of dogs mounted in the driving member so as to engage the driven member and being oppositely beveled so as to ratchet and arranged so that one of them will be actuated at a time, that is, one for driving forward and the other one for reversing.

Another feature consists in adding to the foregoing a yielding connection between the gearing above referred to and the shafts at each side thereof, so that such additional yielding connection will still further permit the retardation of either wheel in case of slippage.

Figure 6:
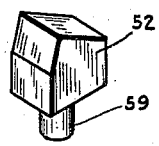
Figure 4:
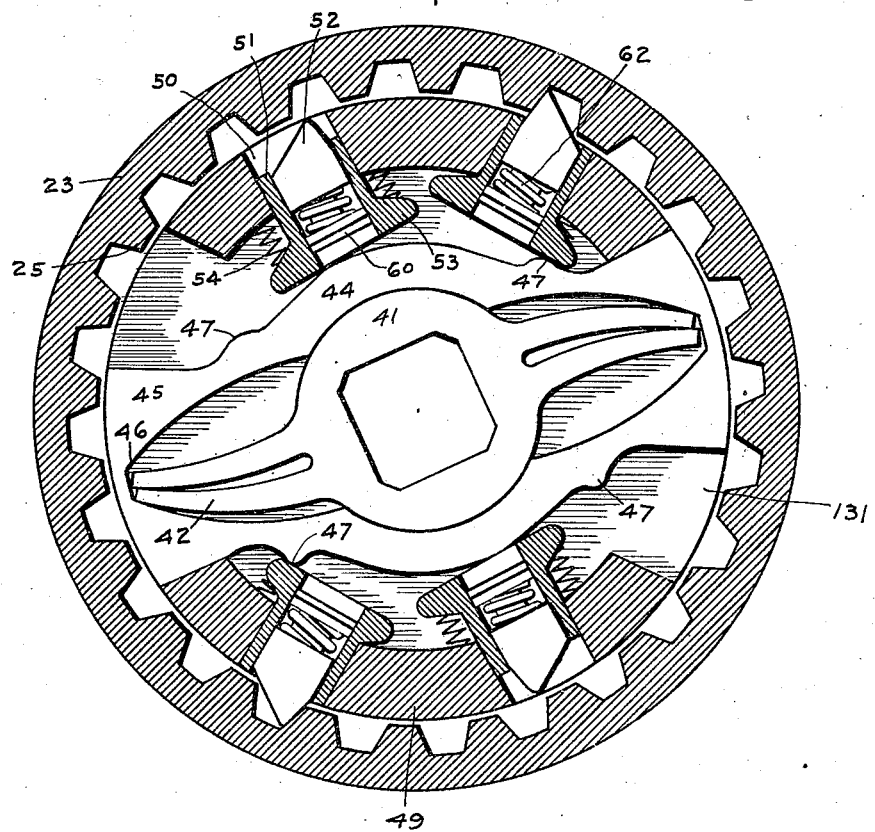

The full nature of the invention will be understood from the accompanying drawings and the following description and claims:

In the drawings, Fig. 1 is a central section through the device taken longitudinally of the axles, parts being broken away. Fig. 2 is a transverse section on the line 2—2 of Fig. 1, but on a larger scale. Fig. 3 is a fragmentary sectional view showing the driving dogs when starting on their ratcheting action. Fig. 4 shows a similar view with the driving dog ratcheting. Fig. 5 is a perspective view of the dog case. Fig. 6 is a perspective view of the dog. Fig. 7 is an elevation of a part of one of the driving axles removed from its casing. Fig. 8 is a transverse sectional view thereof showing the axle enclosed by its casing.

Referring to the drawings in which similar reference numerals designate corresponding parts throughout the several views, 20 indicates a housing which comprises a part of the frame work of a motor-propelled vehicle. Mounted within bearings 22, carried by the housing 20, are sleeves 21 of drums 23, said drums having internal teeth 25, which constitute driven members in the nature of a circular rack. There is a drum 23 at each side of the housing, the sleeves 21 having squared openings 2 at their outer ends, into which are introduced the squared ends 124 of axle sections 122, said axle sections being formed of a spirally arranged spring structure so as to permit one or the other of the axle sections to be retarded in its rotation while the other continues to rotate.

The outer ends of the axle sections 122 are provided with sockets 159, with which engage the ends of the solid portions of the axles 160, the ends of the axles 160 being preferably squared in cross section to engage similarly constructed openings in the sockets 159, thus causing the axles 160 to rotate with the axle sections 122. This furnishes a yielding connection between the drums 23 and the driving wheels of the machine, or the parts to which the axles are connected.

Extending into the sleeves 21 of the drums 23 are sleeves 130, which are integral with and form bearing hubs for and hold in place washer-like plates 131, which lie against the inner faces of the drums 23, and extending through the sleeves 130 are the ends of a shaft 30, that portion of the shaft 30 between the drums having a driving gear 32 attached thereto in any suitable manner, as by means of a key 132, said gear when rotated, driving the shaft 30 and parts co-operating therewith.

Gear 32 is shown formed of a body portion with an annular gear portion 35 secured thereto which co-operates a pinion 40 attached to the driving shaft 37, said shaft projecting through a bearing 36 in the housing, the pinion 40 and shaft 37 deriving their power from the driving means, imparting rotating movement to the disk 32.

The shaft 30 is provided with square portions 30ª, which engage square openings 30ᵇ in the body portions 41 of spring structures, said body portions 41 having oppositely extending spring fingers 42, which are preferably arranged in pairs and slightly spaced apart so as to permit yielding action independently of each other. A frame 44 fits around the spring construction, the central portion of the opening therein partially surrounding the body portion 41 of the spring construction and loosely receiving the spring fingers 42, except at its extreme ends 45, where recesses 46 are provided, into which the ends of the spring fingers 42 project so as to cause the frame 44 to rotate with the shaft 30 and have independent movement of the shaft 30 owing to the spring action of the spring fingers 42. Between each block 44 and the adjacent plate 31 is a spiral spring member 144, see Fig. 1, for causing the plate 131 to frictionally engage the gear 23.

The length of the frame 44 is equal to the diameter of the washer-like plates 131 and slightly less than the internal diameter of the rack portion of drums 23, the ends 45 traveling in the path of blocks 49 on the face of the plate 131, there being a pair of the blocks on each plate and diametrically opposite each other, said blocks being segmental in form and each extending about one-fourth the diameter of the plate to which they are attached.

The outer arcuate faces of the blocks 49 are flush with the peripheral edges of the plates 131, each block or carriage having a pair of radially disposed openings therethrough in which are slidably mounted casings 51, and in said casings are slidably mounted dogs 52, which are designed to cooperate with the rack 25 of the drums 23, to impart rotating motion to the drums.

The casings 51 are arranged in pairs on opposite sides of the frame 44, said frame having pairs of projections 47 on its outer faces, which when turned to one position force two of the casings outwardly which casings are preferably diametrically positioned and when turned in the opposite direction force the other two casings outwardly thereby substituting a balanced and symmetrical construction. As shown in Fig. 5, the casings 51 are formed of two parallel plates, the inner ends of the plates having oppositely located flanges 53, which are adapted to engage the corner portions 47 for forcing the casings outwardly, these flanges also serving to stop the outward movement of the casings by engaging the inner edges of the blocks 49. The casings are forced inward, or returned to normal position, when disengaged from the corner portions 47, through the medium of spiral springs 54, one end of the springs engaging the blocks 49 while the opposite ends thereof engage and rest upon the flanges 53, any suitable means being employed for retaining the springs in position. Each casing is provided with a partition plate 57 formed integral with the side walls of the casing which has a central hole 58 in it through which the circular portion 59 of the dog 52 extends and operates. On the inner end of the portion 59 there is secured a plate 60 which operates in a space 61 in the inner portion of the dog case. A spring 62 surrounds the portion 59 of the dog and one end bears against the dog and the other end against the partition plate 57 so as to normally force the dog outward.

The dog construction is arranged so that when the dog case is at its inward limit of movement and bears against the side of the frame 44, the outward limit of movement of the dog 52 will not project appreciably beyond the block 49 or into engagement with the teeth 25. The two dog constructions are located with reference to each other and to the rocking movement of the frame 44 so that when said frame is rocked in one direction, as shown in Fig. 4, to its limit, that is until the ends 45 are stopped by the blocks 49, the corners 47 will force one set of dogs outward into engagement with the toothed driven member 23, and when the frame 44 is rocked in the opposite direction, it will release the previously mentioned dogs and force the other set of dogs outward into engaging position. The outer ends of the dogs of each pair are oppositely beveled so that one of them is a forward driving dog and the other is a reversing dog, and each will ratchet. In Fig. 4 the forwardly driving dogs are in engagement with the driven member and if the driven member should be driven for any reason temporarily faster than the driving member, said dogs would ratchet and permit such movement of the driven member. If one desired to reverse, he would rock the frame 44 to a diagonally opposite position from that shown in Fig. 4, which would release the driving dogs and would force the reversing dogs out into engagement with the driven member and reverse it. Therefore, the machine will operate in either direction, one dog acting as a forward driving dog and the other as a reversing dog in either event.

With the construction above described, power comes from the engine through the shaft 37 and will be transmitted through a pinion 40, gear 35 and disk 32, to shaft 30, which will, in the beginning of its turning movement, rock the frame 44 to the position shown in Fig. 4, and thus drive the mechanism forwardly. When the parts are as shown in Fig. 4, power is transmitted from the shaft 30 through the spring fingers 42 and frame 44 and dogs to the outer member, the frame 44, dogs and blocks 49 being all located in relative positions for the time being.

In the straight travel of the vehicle the axles 160 will be similarly actuated, but because of the spring fingers 42 in the transmission mechanism there will be a slight yielding of the two axles according to the irregularities of the work and the travel of the two wheels.

When the vehicle turns from the direct line of travel so that one of the wheels must rotate faster than the other, the spring fingers 42 next to the axle traveling faster, will bend more and the springs next to the other axle will bend less than when the vehicle is driving straight ahead and thus make up for the difference in travel of the two wheels, but at the same time transmitting power to both axles.

If, however, in making a turn the outer wheel would have to travel so much further than the inner wheel that the variation would not be provided for by the difference in the bending of the two sets of spring fingers 42, then the outer wheel would travel so much faster than the inner wheel that its drum 23 would travel faster than the driving means within it and thus ratchet on the driving dog. This ratchet movement would be in any event very slight, say one or two or three teeth, but sufficient to make up for the lack of the differential effect produced by the two sets of dogs. In making ordinary turns, the springs would suffice, but in extraordinary sharp turns, the dogs would be permitted to ratchet enough to meet the need of the mechanism, and one set of said forward driving dogs is beveled to provide for such ratcheting action, and another set of dogs is provided for reversing.

The additional arrangements including the springs 122 for permitting additional yielding of the shafts 160, cooperate with the foregoing described gearing. With this arrangement the retardation of the inner wheel of an automobile while making a turn, or of either wheel when there is slippage, still further postpones the time when the ratcheting of a wheel begins, in fact, with this double spring arrangement the power transmitted to the shafts and wheels are much more completely and generally equalized and power is more generally transmitted to both wheels. The occasion for ratcheting seldom arises in actual practice.

To more clearly describe the operation of the differential drive mechanism the following occurs. Fig. 2 illustrates the parts in the neutral position when the drive is associated with a vehicle. It will be understood that the axles 160 are stationary and are maintained in that condition by the weight of the vehicle upon the driving wheels thereof until such time as power is applied to the axles to rotate the driving wheels. Power is obtained from suitable power means, not shown, and is supplied to the differential and axles from the shaft 37 through the pinion 40 and gear 35 to the disk and driving shaft 30 and in a direction to rotate the shaft 30, as seen in Fig. 2, in a counter-clockwise direction. When power is first applied to the differential through the shaft 37, the block 44 moves from the position shown in Fig. 2 to the position shown in Fig. 3 and also the spring members 42 are moved from the position shown in Fig. 2 to the position shown in Fig. 4, thereby rotating the block 44 and the spring members 42 in the same direction and with the shaft 30. In this rotation the cam surfaces 47 encounter the upper right hand and lower left hand casings 53. Since the axle 160 and gear 23 are stationary as heretofore explained and are maintained stationary by the frictional resistance between the wheel and the supporting roadway through the weight of the vehicle, and since the plate 131 lying adjacent said gear 23 is in frictional engagement with said gear and is assisted in its frictional engagement by the spacing and spring means 144, the disk 131 will be momentarily retarded and, therefore, will not instantly be carried around with the block 44 in said block's rotation. This slight frictional resistance between the gear 23 and disk 131 is sufficient to retard the disk 131 in its rotational movement under the impulse of the block 44 and together with the sudden application of power to the shaft 37, this cooperating condition and relationship is sufficient to cause the cam 47 to engage with the casing 53 and force the same radially outward until the projecting tooth or dog 52 engages a tooth of the gear 23. Continued rotation of the shaft 30, since the shaft 160 and gear 23 are still stationary, further retards the rotation of the disk 131 by means of the engaging tooth 25 until the frame or block 44 is turned from the position shown in Fig. 3 to the usual driving position shown in Fig. 4. Simultaneously therewith the tooth 52 is positively projected into full engagement with the tooth 25. Continued rotation of the shaft 30 through the block 44 further flexes the springs 42 and power is then transmitted to the axle 160 to rotate the same. Simultaneously with the foregoing operation, it will be noted that the upper left hand casing and lower right hand casing and the dogs or teeth therein, as shown in Figs. 2 and 4, are removed to retracted position.

In the over-running movement of the differential, which condition is obtained when the vehicle makes a turn, the outer wheel, due to the momentum of the vehicle and due to the driving power of the inner wheel transmitted through the frame of the vehicle, compels the outer wheel to move with the vehicle, and therefore, said wheel travels at a greater angular velocity than the inner wheel and, therefore, since both blocks 44 are driven at the same rate, the flexible members 42 and the gear 23 associated with the axle 160 supporting the outer wheel will rotate faster than the outer wheel driving block 44, thereby causing an over-running condition. In the over-running condition the gear 23 rotates counter-clockwise and as heretofore explained, at a greater speed than the block 44 which is carrying with it the disk 131. Since there is a certain amount of flexibility in the springs 42 and since there is a slight frictional resistance between the plate 131 and the gear 23, it would naturally be assumed that when the gear 23 over-runs the disk 131 and forces the tooth 52, see Fig. 3, inwardly, causing the compression of the spring 62, that the gear 23 would carry the disk 131 counter-clockwise at a greater rate than the block 44, and thereby cause the reversing casing 53 to engage the opposite or reverse driving lug 47, thereby projecting the reversing driving tooth 52 into engagement with the tooth 25 and prevent further over-running. The drive when associated with a motor vehicle under the worst conditions, to-wit, a short wheel base, such as a Ford automobile, turns in the smallest possible circle with a diameter of twenty-eight feet, and since the smallest diameter of the wheels is 30 inches, only three additional revolutions of the outer wheel over that of the inner wheel are necessary to make a complete turn. In a quarter turn, the outer wheel, therefore, makes less than one complete revolution additional over the inner wheel, and these conditions it is to be remembered are under the worst mechanical limitations. Therefore, however natural the theoretical assumption heretofore made may be, the actual results obtained in practice, due to the aforesaid mechanical limitations of the drive, permit the differential to operate as described. In actual road conditions the motor vehicles seldom, if ever operates under the above adverse conditions and, therefore, since less than one additional revolution is required for the worst quarter turn, it will be apparent that the surplus power in the over-running gear 23 is not sufficient to force the reversing drive 53 upon the reversing driving lug 47. There is this to be said, however, that in the starting of the vehicle the gear 23 opposes rotation while the shaft 30 forces rotation, but in the over-running movement the shaft 30 forces rotation and the gear 23 also forces rotation and it is because of these conditions, as well as that theretofore explained, that the device when actually applied to a motor vehicle is an operative device, whereas theoretically the over-running movement of the gear 23 would project the reversing tooth 52 into engagement with the over-running gear and prevent said over-running. When the over-running wheel axle 160 and gear 23 have been retarded so that the same rotates at the same or less angular velocity as the shaft 30, the tooth 52, which has been held in the position shown in Fig. 3 by the ratcheting of the gear 23 thereof upon the tooth 52, is projected, under the influence of the spring 62 into engagement with one of the teeth 25 to continue the forward driving of the gear 23, as well as the associated axle and vehicle wheel.

When it is desired to reverse the direction of driving, it will be understood that the direction of rotation of the shaft 30 is reversed, which is transmitted through the spring members 42, and when the blocks 44 are moved from the position shown in Fig. 4 through the position shown in Fig. 2 to a position which is the reverse of that shown in Fig. 4, to wit, the retracted casing with its projected dog is then in the projected position while the projected casing of Fig. 4 with the projected dog would then be in the retracted position. Continued reverse rotation of the shaft 30 causes the reverse driving cam surfaces 47 to engage the upper left hand casing 53 and lower right hand casing 53, see Figs. 2 and 4 and projects the same outwardly, whereupon the same action as previously described for the forward casing and tooth occurs. Similarly, if the gear 23 were to over-run in the reverse rotation the action thereof is as that described for the reverse over-running rotation.

The invention claimed is:

1. In a power transmitting mechanism a plurality of driven members and a driving mechanism for the same including a driving member, yielding means through which power is transmitted to each member and arranged so that the same is always under power from the driving member in differentiating and when one of said driven members is accelerated the other driven member will be retarded relatively to the first mentioned driven member through said yielding means within the yielding range thereof by virtue of the direct and yielding connection.

2. In a power transmitting mechanism a plurality of driven members and a driving mechanism for the same including a driving member, yielding means through which power is transmitted to both driven members and arranged so that the same is always under power from the driving member in differentiating and when one of said driven members is accelerated the other driven member will be retarded within the yielding range of the yielding means and by virtue of the direct and yielding connection, and the relative surplus power gained by the retardation will be transmitted to the accelerated member.

3. In power transmitting mechanism, a driving member, a driven member surrounding the driving member and internally toothed, a radially movable dog for engaging said teeth, and yielding means on the driven member for moving the dog into engaging position.

4. In power transmitting mechanism, a driving member, a driven member surrounding the driving member and internally toothed, a pair of oppositely located radially movable dogs for engaging said teeth, and yielding means on the driving member for yieldingly moving the dogs into engaging positions.

5. In power transmitting mechanism, a driving member, a driven member surrounding the driving member and internally toothed, a pair of oppositely located radially movable dogs for engaging said teeth, yielding means on the driving member for yieldingly moving the dogs into engaging position, and means for releasing the dogs when not actuated.

6. In power transmitting mechanism, a driving member, a driven member surrounding the driving member and internally toothed, a pair of oppositely located radially movable dogs for engaging said teeth, and means on the driving member arranged to move said dogs into engaging position when the shaft is driven in either direction.

7. In power transmitting mechanism, driving means, a plurality of independent driven members surrounding the driving means and each internally toothed, a radially movable dog for engaging the teeth of each driven member, and yielding means on said driving means for yieldingly moving said dogs independently into engaging positions with their respective driven member.

8. In power transmitting mechanism, driving means, a plurality of independent driven members surrounding the driving means and internally toothed, a pair of oppositely located radially movable dogs for engaging the teeth of each driven member, yielding means on said driving means for yieldingly moving the dogs into engagement with their respective driven members, and means for releasing the dogs when not actuated.

9. In power transmitting mechanism, driving means, a plurality of independent driven members surrounding the driving means and internally toothed, a pair of oppositely located radially movable dogs for engaging the teeth of each driven member, means on the driving means for moving said dogs independently into engaging positions with their respective driven members when the driving means is driven in either direction, and means for releasing the dogs when not actuated.

10. In power transmitting mechanism, a plurality of toothed annular driven members, a driving mechanism including yielding means through which power is transmitted to each driven member, whereby said driving mechanism will have a limited yielding effect on said driven members, and a dog carried by the driving mechanism for engaging each toothed annular member and transmitting power from the driving mechanism to each of the driven members and formed so as to ratchet if a driven member travels faster than the driving mechanism.

11. In power transmitting mechanism, a plurality of driven members, a driving mechanism including yielding means through which power is transmitted to each driven member and arranged so that when one of said driven members is accelerated the other driven member will be relatively retarded, and a dog carried by the driving mechanism for engaging and transmitting power from the driving mechanism to each of the driven members and formed so as to ratchet if a driven member travels faster than the driving mechanism.

12. In power transmitting mechanism, a pair of toothed annular driven members, a driving shaft adjacent to said driven members, a driving mechanism having yielding means through which power is transmitted from said shaft to each of said driven members, and a dog carried by the driving mechanism for engaging each toothed annular member and transmitting power from the driving mechanism to each of the driven members and formed so as to ratchet if a driven member travels faster than the driving mechanism.

13. In power transmitting mechanism, a pair of toothed annular driven members in alignment with each other, driving means between the ends of said members and in alignment with them, a driving mechanism for each driven member having yielding means through which power is transmitted from said driving means to each of said driven members, and a dog carried by the driving mechanism for engaging each toothed annular member and transmitting power from the driving mechanism to each of the driven members and formed so as to ratchet if a driven member travels faster than the driving mechanism.

14. In power transmitting mechanism, a pair of toothed annular driven members, driving means adjacent to said members, driving mechanism mounted on said driving means having yielding means through which power is transmitted from said driving means to the adjacent driven member, and a dog carried by the driving mechanism for engaging each toothed annular member and transmitting power from the driving mechanism to each of the driven members and formed so as to ratchet if a driven member travels faster than the driving mechanism.

15. In power transmitting mechanism, a driving member, a driven member surrounding the driving member and internally toothed, a radially movable dog for engaging the teeth of the driven member and arranged so as to ratchet when the driven member revolves more rapidly than the dog, and yielding means on said driving member for moving the dog into engaging position and transmitting power from the driving member to the driven member.

16. In power transmitting mechanism, a driving member, a driven member surrounding the driving member and internally toothed, a pair of oppositely located radially movable dogs for engaging the teeth of said driven member and ratcheting when the driven member travels faster than the dog, yielding means on the driving member for yieldingly moving the dogs into engaging position and transmitting power from said driving member to said driven member, and means for releasing the dogs when not actuated.

17. In power transmitting mechanism, driving means, a plurality of independent driven members surrounding the driving means and each internally toothed, a radially movable dog for engaging the teeth in each driven member and arranged so as to ratchet when the driven member travels faster than the dog, and means mounted on said driving means for moving said dogs independently into engaging positions with their respective driven members and transmitting power to said driven members.

18. In power transmitting mechanism, a driving shaft, a driven member surrounding the driving shaft and internally toothed, radially projecting spring fingers secured on said shaft within said driven member, a frame loosely surrounding said shaft and spring fingers and adapted to be engaged and actuated by the fingers, and a radially movable dog between said frame and the driven member in position to be moved by said frame through the rotation of the shaft so as to engage and transmit power to the driven member, said dog being arranged to ratchet when the driven member travels faster than the dog.

19. In power transmitting mechanism, a driving shaft, a plurality of driven members surrounding the driving shaft and internally toothed, radially projecting spring fingers secured on said shaft within each driven member, a frame within each driven member loosely surrounding said shaft and spring fingers and adapted to be engaged and actuated by the fingers, and a radially movable dog between said frame and its corresponding driven member in position to be moved by said frame at the beginning of the rotation of the shaft and to engage and drive said driven member, said dog being formed so as to ratchet when the driven member travels faster than the dog.

20. In power transmitting mechanism, an annular driven member internally toothed, a rotatable driving member within said driven member, a radially movable dog case in said driven member, means in said driven member for forcing said dog case outward, springs for returning said dog case, and a dog yieldingly mounted in said dog case in position when actuated to engage the driven member when the dog case is in its outer position, said dog being formed so as to ratchet when the driven member travels faster than the dog.

21. In power transmitting mechanism, a driving shaft, a driven member surrounding the driving shaft and internally toothed, a radially projecting spring secured on said shaft within said driven member, a frame loosely surrounding said shaft and spring and adapted to be engaged and actuated by said spring, a radially movable dog case in position to be actuated by said frame when rocked, springs for returning said dog case in position to engage the teeth of the driven member when the dog case is forced outwardly.

22. In power transmitting mechanism, an annular toothed driven member internally toothed, a rotatable driving member, a pair of dogs movably and radially mounted on said driving member and oppositely beveled so that they will ratchet, and a single means for actuating said dogs arranged so that when moved into one position it will actuate one dog and release the other and when moved into another position will reverse the positions of the dogs.

23. In power transmitting mechanism, an annular toothed driven member internally toothed, a rotatable driving member, a pair of dogs movably and radially mounted on said driving member and oppositely beveled so that they will ratchet, and rocking means formed so that when rocked in one position it will actuate one dog and release the other and when reversely rocked it will release the actuated dog and actuate the other dog.

24. In power transmitting mechanism, an annular toothed driven member internally toothed, a rotatable driving member, a pair of dogs movably and radially mounted on said driving member and oppositely beveled so that they will ratchet, a shaft in said driving member, and a frame loosely mounted on said shaft so that when the shaft is started in either direction said frame will rock relative to the shaft and said frame being so formed that it will alternately actuate and release said dogs when it is rocked in alternate directions.

25. In power transmitting mechanism, a driving axle member, an internally toothed driven member surrounding said axle member, a pair of movably mounted radially disposed dogs on the same side of the center of said member for engaging and driving said toothed member and oppositely beveled, and means for actuating one or the other of said dogs from said axle member according to the direction of rotation of said axle member.

26. In power transmitting mechanism, a driving member, an internally toothed driven member surrounding said driving member, a pair of radially disposed dogs on each side of the center of said members for engaging and driving said toothed member and each pair of dogs oppositely beveled, a member housing within said toothed member in which said dogs are yieldingly mounted, and means adapted to be rocked by said driving member and in either direction according to the direction of the rotation of the driving member for engaging operating one of the other of each pair of said dogs.

27. In power transmitting mechanism, an annular driven member internally toothed, a driving member, a pair of dogs movably and radially mounted in said driving member and oppositely beveled so that they will ratchet, rocking means formed so that when rocked in one position it will actuate one dog and release the other and when reversely rocked it will release the actuated dog and actuate the other dog, and a driving member for rocking said rocking means.

28. In power transmitting mechanism, a driving shaft, a driven member surrounding the driving shaft and internally toothed, a radially movable dog for engaging said teeth, yielding means on the shaft for moving the dog into engaging position, an axle at each side of said driven member and yielding connections between said driven member and said axles for yieldingly transmitting power to the axles.

29. In power transmitting mechanism, a driving shaft, a plurality of independent driven members surrounding the driving shaft and each internally toothed, a radially movable dog for engaging the teeth of each driven member, and yielding means on said shaft for yieldingly moving said dogs independently into engaging positions with their respective driven member, an axle at each side of said driven member and yielding connections between said driven member and said axles for yieldingly transmitting power to the axles.

30. In power transmitting mechanism, a pair of driven members, a driving member adjacent to said driven members, a driving mechanism having yielding means through which power is transmitted from said driving member to each of said driven members, dogs carried by the driving mechanism for engaging and transmitting power from the driving mechanism to each of the driven members and formed so as to ratchet if a driven member travels faster than the driving mechanism, and yielding connections between said driving mechanism and said driven members.

31. In power transmitting mechanism, a driving shaft, a driven member concentric with the driving shaft and peripherally toothed, a radially movable dog for engaging the teeth of the driven member and arranged so as to ratchet when the driven member revolves more rapidly than the dog, yielding means on said shaft for moving the dog into engaging position and transmitting power from the shaft to the driven member, and a yielding connection between said driving mechanism and said driven members.

32. In power transmitting mechanism, a driving shaft, a plurality of driven members surrounding the driving shaft and internally toothed, radially projecting spring fingers secured on said shaft within each driven member, a frame within each driven member loosely surrounding said shaft and spring fingers and adapted to be engaged and actuated by the spring fingers, a radially movable dog between said frame and its corresponding driven member in position to be moved by said frame at the beginning of the rotation of the shaft and to engage and drive said driven member, said dog being formed so as to ratchet when the driven member travels faster than the dog, and a yielding connection between said driving mechanism and said driven members.

33. In a power transmitting mechanism, a driving member, a driven member concentric with said driving member and peripherally toothed, a radially projecting finger secured on said driving member adjacent said driven member, a carriage, a radially movable dog supported on said carriage and actuated by said finger to engage and drive said driven member by said driving member, and means for frictionally retarding said carriage to project said dog into engagement with said internally toothed driven member.

34. In a power transmitting mechanism, a driving member, a driven member concentric with said driving member and peripherally toothed, a radially projecting finger secured on said driving member adjacent said driven member, a carriage, a radially movable dog supported on said carriage and actuated by said finger to engage and drive said driven member by said driving member, and means for frictionally retarding said carriage to project said dog into engagement with said internally toothed driven member, said dog being formed so as to ratchet when the driven member travels faster than the driving member.

35. In a power transmitting mechanism, a driving member, a driven member concentric with said driving member and peripherally toothed, a radially projecting finger secured on said driving member adjacent said driven member, carriage means a pair of radially movable dogs supported on said carriage means and actuated by said finger to engage and reversibly drive said driven member by said driving member when the latter is reversed, and means for frictionally retarding said carriage means to project either of said dogs into engagement with said peripherally toothed driven member.

36. In a power transmitting mechanism, a driving member, a driven member concentric with said driving member and peripherally toothed, a radially projecting finger secured on said driving member adjacent said driven member, carriage means a pair of radially movable dogs supported on said carriage means and actuated by said finger to engage and reversibly drive said driven member by said driving member when the latter is reversed, and means for frictionally retarding said carriage means to project either of said dogs into engagement with said peripherally toothed driven member, said dogs being formed so as to ratchet when the driven member travels faster than the driving member.

37. In a power transmitting mechanism, a driving member, a driven member concentric with said driving member and peripherally toothed, radially projecting finger means secured on said driving member adjacent said driven member and extending diametrically thereof, carriage means adjacent said driven member, a plurality of pairs of diametrically positioned radially movable dogs supported on said carriage means and actuatable by said finger means for causing a pair of said dogs to engage and drive said driven member and be driven by said driving member, and means for frictionally retarding said carriage means to project a pair of said dogs into engagement with said peripherally toothed driven member to drive the same.

38. In a power transmitting mechanism, a driving member, a driven member concentric with said driving member and peripherally toothed, radially projecting finger means secured on said driving member adjacent said driven member and extending diametrically thereof, carriage means adjacent said driven member, a plurality of pairs of diametrically positioned radially movable dogs supported on said carriage means and actuatable by said finger means for causing a pair of said dogs to engage and drive said driven member and be driven by said driving member, and means for frictionally retarding said carriage means to project a pair of said dogs into engagement with said peripherally toothed driven member to drive the same, said dogs being formed so as to ratchet when the driven member travels faster than the driving member.

In witness whereof, I have hereunto affixed my signature.

WILLIAM H. HARRIS.